United States Patent [19]
Akhundov et al.

[11] 3,954,390
[45] May 4, 1976

[54] METHOD FOR PRODUCING AGGREGATE USED IN HARDENING COMPOSITIONS, PREDOMINANTLY CONCRETES, A FLUIDIZED-BED KILN FOR CALCINING MINERAL STOCK BY MEANS OF SAME METHOD, AND AN AGGREGATE PRODUCED BY SAME METHOD

[76] Inventors: Alizakir Alikhady Ogly Akhundov, ulitsa Shkolnaya, 8, kv. 8, Moskovskaya oblast, poselok Kraskovo; Nikolai Borisovich Kondukov, prospekt Vernadskogo, 9/10, kv. 343, Moscow; Kharlampy Sergeevich Vorobiev, ulitsa Zelenaya, 20, kv. 45, Ljubertsky Moskovskoi oblasti; Valentin Matveevich Dementiev, ulitsa Postysheva, 35, kv. 47, Donetsk; Boris Solomonovich Farber ulitsa Novovokzalnaya, 12, kv. 7, Kuibyshev; Alexei Alexandrovich Zelenov, ulitsa K. Marxa, 117/14, kv. 17; Vladimir Alexandrovich Logvinov, ulitsa K. Marxa, 117/8, kv. 4, both of Moskovskaya oblast, poselok Kraskovo; Anna Ilinichna Polinkovskaya, 2 Schemilovsky pereulok, 8/10, korpus A, kv. 15; Galina Alexandrovna Petrikhina, ulitsa Gorkogo, 41, kv. 136, both of Moscow, all of U.S.S.R.

[22] Filed: June 28, 1974

[21] Appl. No.: 484,234

[52] U.S. Cl.................................. 432/14; 34/57 A; 432/58

[51] Int. Cl.².......................................... F27B 15/10
[58] Field of Search.......................... 432/13, 14, 58; 34/57 A

[56] References Cited
UNITED STATES PATENTS

| | | | |
|---|---|---|---|
| 2,528,098 | 10/1950 | White | 432/15 X |
| 2,835,483 | 5/1958 | Lindsay | 432/58 X |
| 3,085,022 | 4/1963 | Koch | 432/13 X |
| 3,737,283 | 6/1973 | Nikles | 432/58 |
| 3,799,747 | 3/1974 | Schmalfeld et al. | 432/58 X |
| 3,822,986 | 7/1974 | Tsekhovoi et al. | 432/58 X |
| 3,861,862 | 1/1975 | Steever | 34/57 A |

*Primary Examiner*—John J. Camby
*Attorney, Agent, or Firm*—Holman & Stern

[57] ABSTRACT

The stock is calcined when gaseous fuel and air are introduced into a bed of material at the bottom in separate jets uniformly distributed over the cross section of bed.

In a fluidized-bed kiln the burners are uniformly distributed over the entire area of hearth and each burner is a gas/air nozzle incorporating a cone-shaped cap a diffuser which form an annular passage for the air to pass whereas the gas passes through a central passage provided in the cone-shaped cap and running coaxially with the annular passage.

In another embodiment of the fluidized-bed kiln, the burners are fitted into the hearth of kiln uniformly over its entire area and each burner is a gas nozzle projecting upwards in the form of a vertical tube with a cone-shaped cap forming with the wall of the tube an annular passage for the gas to pass.

6 Claims, 5 Drawing Figures

METHOD FOR PRODUCING AGGREGATE USED IN HARDENING COMPOSITIONS, PREDOMINANTLY CONCRETES, A FLUIDIZED-BED KILN FOR CALCINING MINERAL STOCK BY MEANS OF SAME METHOD, AND AN AGGREGATE PRODUCED BY SAME METHOD

The present invention relates to the fabrication of building materials, and more specifically to a method for producing aggregates used in hardening compositions (predominantly concretes) such as, for example, keramzite sand, expanded perlite and the like from argillaceous and eruptive rocks by calcining the mineral stock; a fluidized kiln for calcining said stock; and also an aggregate produced by the same method.

A point to be observed in fabricating aggregates for hardening building compositions is that the unit weight of product must be as low as possible and to that end the mineral stock (argillaceous, eruptive and other rocks) is expanded while being calcined. For the expansion, the most favourable conditions are those when the stock is rapidly heated to a temperature at which it is transformed into a pyroplastic state. Yet, when turned into this state, the stock tends to sinter and the sintered material deposited in the kiln interferes with the normal process of calcining. To avoid this, the methods for producing aggregate must comply with certain specifications intended to eliminate sintering during the process of calcining.

There is widely known a method for producing porous aggregate for concrete wherein argillaceous stock is prepared by being comminuted to particles of requisite size, preheated and then calcined and expanded in a fluidized bed. A material in particulate form is said to be fluidized when a rising stream of gas is passed through a bed at a velocity sufficient to lift particles and keep them suspended so that the bed behaves like a boiling liquid. This bed is termed fluidized bed.

Depending on the properties of stock, the stock may be prepared for calcining by any of the known methods which are dry, plastic and wet. When the dry method is used, the stock is comminuted and sized after being dried. On being prepared so as to have the properties specified, the stock is preheated at a temperature between 200° and 400°C and then fed into a calcining kiln.

In the known method, the stock is calcined with the aid of coal which is ground and sized in advance, fed into the kiln mixed with the stock and burnt directly in the bed of the stock processed. To assure the combustion of the solid fuel contained in the bed and obtain the fluidizing action, some liquid or gaseous fuel is burnt in a self-contained firing box and the products of combustion, on being mixed with excess air, are introduced into the bed of stock at the bottom at a temperature lower than that at which the stock is transformed onto the pyroplastic state.

The solid fuel introduced onto the kiln with the stock processed burns in the fluidized bed due to the presence of excess air in the gases from the self-contained firing box and heats the stock to the temperature at which it is transformed into the pyroplastic state and is calcined without sintering at the same time.

However the end product calcined by the known method is contaminated by unburnt particles of the solid fuel whose combustion takes place in the fluidized bed (this is particularly true with respect to fine-grained fractions of the product) with the result that the bulk density of aggregate increases while the properties of aggregate become poorer.

The process involved on the known method is a complicated one because there is needed additional equipment for the preparation of coal and the self-contained firing box. Moreover, the economy of calcining process is poor due to the heat losses which are unavoidable because a certain amount of fuel is burnt in the self-contained firing box and some of the fuel contained in the fluidized bed remains unburnt.

There is further known another fluidized-bed kiln for calcining materials in particulate form. Said kiln is subdivided into three zones where the heating, calcining and cooling of stock takes place and is provided with gas burners fitted in the hearth. Each burner is a uniflow nozzle through which fuel is admitted either at the centre or periphery.

Said kiln is intended for the calcining of products which do not sinter, as lime for example, and an attempt to utilize it as a means of calcining sintering materials has failed to give satisfactory results because of the deposition of sintered material between burners to a level exceeding that of nozzles so that the process could not be completed. The explanation is that in said kiln the burners are designed so that gas is admitted into the stream of air at a point which is below the end face of nozzle and owing to that the combustion of fuel takes place in close proximity to the hearth of kiln where the material is deposited between the burners in a layer exceeding the height of nozzles. Nonuniform disposition of the burners over the area of hearth commonly met with in practice is a factor extending the area of dead zones and bringing about further sintering.

Also widely known is a fluidized-bed kiln for calcining materials in particulate form wherein air is admitted into the bed through a perforated hearth and fuel is fed through burners arranged horizontally in the wall of shaft above the hearth. This way introducing gaseous fuel onto the bed of material is incompatible with big-diameter kilns obviously due to the penetrating power of horizontal gas jets in fluidized bed which is too low to maintain the temperature at the center of kiln at the level specified. Low productivity of the kiln and poor quality of the product are obvious consequences.

It is an object of the present invention to provide a method for producing aggregates for hardening compositions, predominantly concretes, assuring considerable simplification and good economy of the process of calcining, and high quality of the product.

Another object of the present invention is to provide a fluidized-bed kiln for calcining mineral stock which assures high productivity, stability and reliability in operation.

A further object of the present invention is to provide an aggregate for hardening compositions which is of polydisperse granulometric composition, exhibits high strength and low bulk weight of pellets with closed-pore structure and compact rough surface.

Said and other objects are attained by the fact that in producing aggregates for hardening compositions, predominantly concretes, from mineral stock by calcining same in a fluidized bed with the aid of fuel burnt directly in the bed of the material processed, the calcining of stock is accomplished according to the invention by introducing gaeous fuel and air into the bed at its bottom in separate jets uniformly distributed over the cross section of bed.

It is expedient to introduce the gaseous fuel and air at velocities which are 100 to 300 m/sec and 10 to 50 m/sec, respectively.

In a fluidized-bed kiln for calcining mineral stock provided with burners fitted into the hearth, the burners are uniformly distributed according to the invention over the entire area of hearth and each burner is a gas/air nozzle incorporating a cone-shaped cap and a diffuser which form an annular passage for the air to pass whereas the gas is fed through a central passage of the cap running coaxially with the annular passage.

In another embodiment of the fluidized-bed kiln for calcining mineral stock with a perforated hearth for introducing air and burners serving to feed fuel, the burners are uniformly distributed according to the invention over the entire area of hearth and each burner is a gas nozzle projecting upwards in the form of a vertical tube with a cone-shaped cap forming with the wall of tube an annular passage for the gas to pass. In the fluidized-bed kiln like this, the space above perforated hearth may be filled with bulk refractory material placed level with the nozzles.

The essence of the invention disclosed is as follows. When gas and air are introduced into the bed of material at the bottom in separate jets uniformly distributed over the cross section section of bed, the material is fluidized. At this stage formed around each jet at its lower portion is a torch containing particles of material in a concentration which is by for lower than the concentration of particles on the surrounding fluidized bed. If the velocities of gas and air flows are correctly selected within the specified limits which are 100 to 300 m/sec and 10 to 50 m/sec respectively, the jets are properly spaced apart and the nozzles given correct configuration, the torches form a zone in the lower portion of bed where the solid phase is contained in a concentration which is by far smaller than elsewhere. Low concentration of the solid phase in the lower portion of bed and also the fact that gaseous fuel is mixed with air and burnt in a turbulent stream of gas developing in a cocurrent flow of cold air are factors which prevent the sintering of material. Furthermore, solid particles of material coming within close reach from the end face of a nozzle are injected into the torch, contributing thereby to the mixing of material and preventing the formation of dead zones at levels above the nozzles.

Compared with the known methods, the method disclosed offers saving in fuel amounting to between 300 and 400 kcal/kg of end product and increase the output by 20 to 30 percent per square meter of kiln hearth.

The gas/air nozzles are uniformly distributed over the entire area of hearth at a certain spacing selected depending on the diameter of kiln, physical properties and granulometric composition of material so that gas and air can be admitted into the bed of material at the bottom in separate jets uniformly distributed over the cross section of bed as this is required for carrying out the process by means of the method dicclosed. The cone-shaped cap and diffuser each nozzle is fitted with to form an annular passage for introducing air assure that the air is fed at an angle to the vertical, this angle being selected depending on the properties of material and the characteristics of gaseous fuel. Owing to this, fuel is being burnt in a zone where the material is mixed intensively and calcined without sintering.

The perforated hearth enables uniform distribution of air over the entire cross section of the bed so that dead zones are eliminated in the material and the cone-shaped cap, each gas nozzle is fitted with directs the outflow of air at an angle to the vertical, this angle being selected depending on the characteristics of fuel and physical properties of material. Owing to this, fuel is being burnt in a zone where the material is mixed intensively and calcined without sintering. The bulk refractory material filling the space above perforated hearth to a height level with the gas nozzles allows air to pass and prevents the perforated hearth from overheating so that this components can be made of a non-refractory material.

Owing to the burners specially designed, in the kiln disclosed the entire heat input required for the calcining is introduced by burning fuel directly in the fluidized bed of the material processed with the result that the losses of heat into the surrounding medium are cut to a minimum.

The essence of the present invention will be best understood from the following detailed description of a preferred embodiment of a fluidized-bed kiln when this description is being read in conjunction with the drawings in which FIG. 1 is a side elevation of the fluidized-bed kiln according to the invention, partly cut away;

Figure 1:
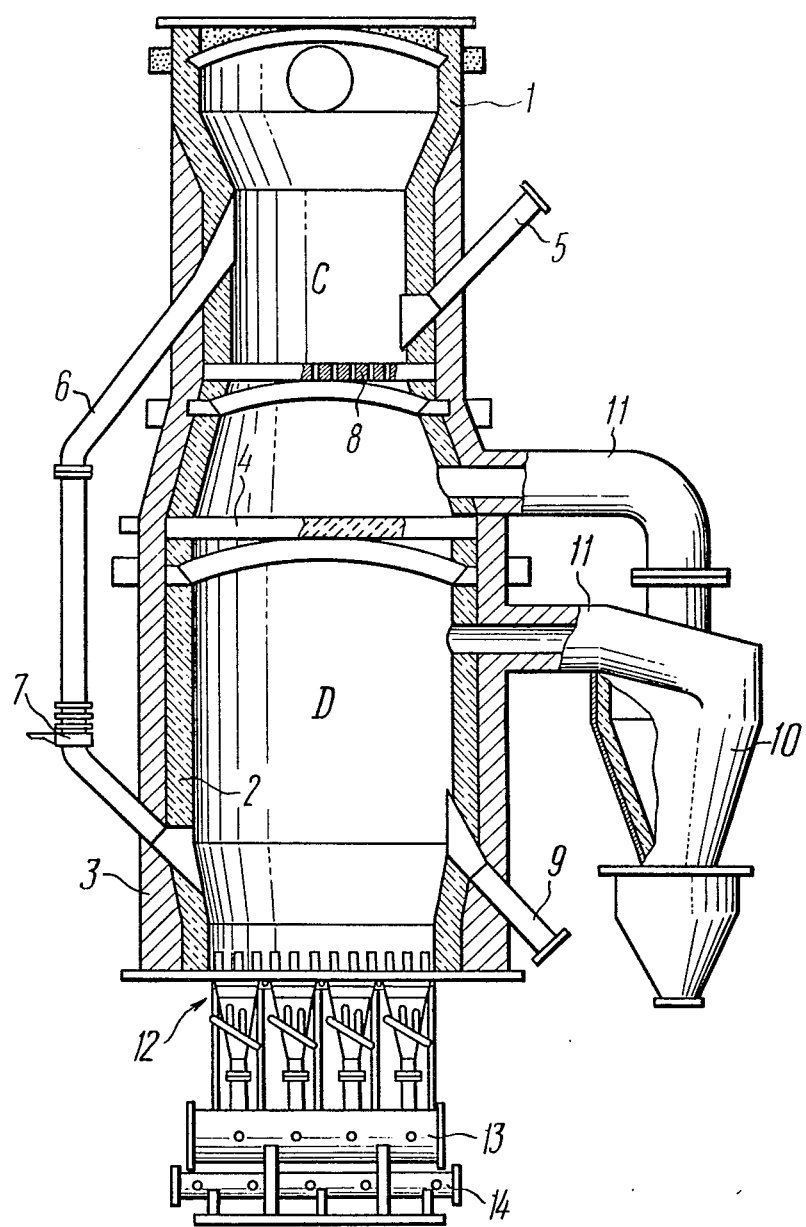

Referring to FIG. 1, the fluidized-bed kiln consists of a vertical shaft 1 with the lining arranged in two layers, the inside layer 2 being refractory brick and the outside layer 3 a heat insulation. A blank partition 4 subdivides the shaft 1 into two zones, C and D. While the zone C serves the purpose of preheating the material loaded through a pipe 5, the zone D is the calcining zone wherein the material is fed from the zone C over an external pipe 6 fitted with a gas lock 7. A grating 8 is provided in the preheating zone to give support to the material during the heating preparatory to calcining. On being calcined, the material is discharged from the zone D through a pipe 9. A lined cyclon 10 connected to the shaft 1 of the kiln through gas ducts 11 is an item of kiln equipment.

Figure 2:
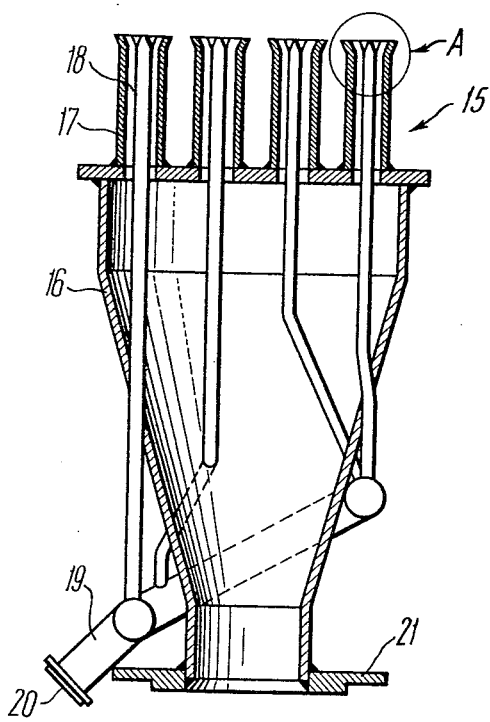
FIG. 2 is a sectional elevation of a gas-burning contrivance on an enlarged scale used in the kiln.

The hearth of kiln is a gas-burning contrivance 12 with manifolds 13 and 14 serving to admit air and gas, respectively, into the kiln. The gas-burning cotrivance is a plurality of units 15 (FIG. 2) each consisting of a welded housing 16 accomodated wherein are air tubes and gas tubes 17 and 18, respectively. The gas tubes 18 are interconnected one to another through a manifold 19 provided with a flange 20 by means of which the manifold 19 is connected to a manifold 14. Each welded housing 16 has a flange 21 which serves to connect the housing to a manifold 13.

Figure 3:
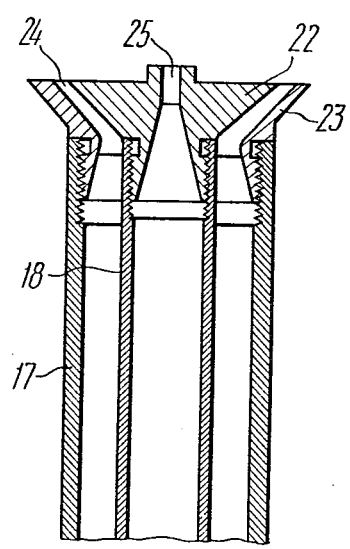
FIG. 3 is a sectional elevation of unit A of FIG. 2 on an enlarged scale.

The gas tubes and air tubes 18 and 17, respectively, are placed one into another to form gas/air nozzles each of which is fitted with a cone-shaped cap 22 (FIG. 3) and a diffuser 23 forming an annular passage 24 for admitting air into the kiln. The outflow of gas is through a central passage 25 provided in the cone-shaped cap 22 coaxially with the annular passage 24.

In another embodiment the hearth of kiln is a gas-burning contrivance 12 made up of individual units 26 (FIG. 4) each consisting of a housing 27 with a perforated plate 28 welded at the top and a flange 29 provided at the bottom for connecting to the manifold 13.

The gas-burning contrivances 12 are installed in place so that the perforated plates 28 form a continuous perforated hearth admitted through which into the bed of calcined material is air. Fitted into the perforated plate 28 uniformly over its entire area are gas tubes 30 interconnected one to another through a manifold 31 connected to the manifold 14 by a flange 32.

Figure 4:
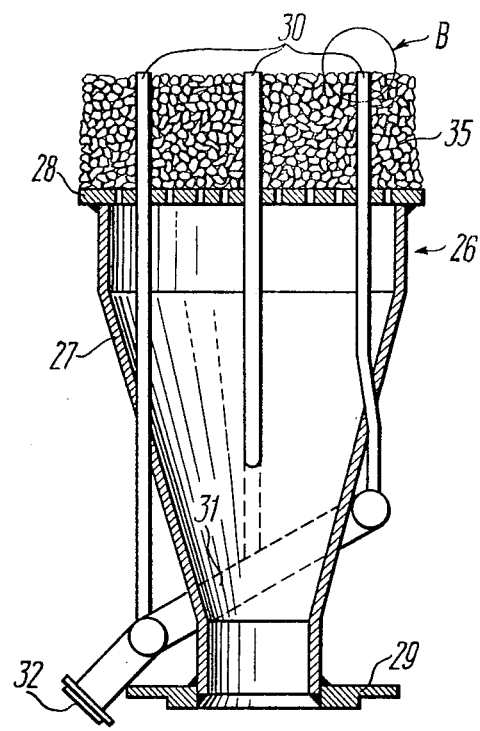
FIG. 4 is a sectional elevation of a gas-burning contrivance in another embodiment on an enlarged scale.
Figure 5:
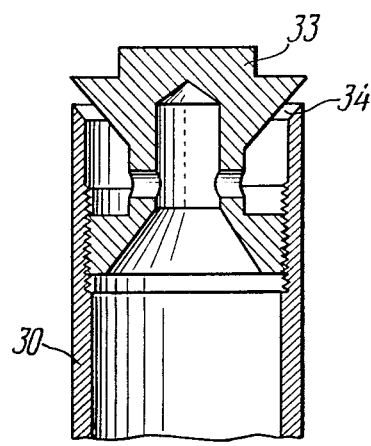
FIG. 5 is a sectional elevation of unit B of FIG. 4.

Each gas tube 30 is fitted with a cone-shaped cap 33 (FIG. 5) and forms in conjunction with same a gas nozzle with an annular passage 34 for admitting gas into the kiln. The space above perforated hearth is filled with a bulk refractory material 35 placed level with the nozzles (FIG. 4).

The kiln operates on the following lines. Natural gas and air are fed separately through the manifolds 13 and 14 (FIG. 1) and the gas-burning contrivance 12 into the calcining zone D of the kiln where the gas burns. The flue gases are fed under the grating 8 of the preheating zone C, passing on their way the ducts 11 and lined cyclon 10.

Crushed mineral stock of a specified granulometric composition is continuously fed into the kiln through the pipe 5, falling on the grating 8 of the preheating zone C where the stock is preheated in a fluidized ved by the hot gases from the calcining zone. Leaving the preheating zone over the pipe 6 with the gas lock 7 preventing the escape of gases from the calcining zone D into the preheating zone C, the stock enters the calcining zone D where it is again fluidized by the rising jets of natural gas and air uniformly distributed over the cross section, rapidly heated to the temperature of calcining and expanded due to the heat liberated during the combustion of gaseous fuel. The calcine is continuously discharged from the calcining zone D through the pipe 9 and the flue gases are directed into the preheating zone C after being separated from dust in the lined cyclon 10. The material settled in the cyclon 10 is collected as end product.

The principle of operation described above enables the designing of fluidized-bed kilns of any given output which can be as high as 3 $m^3/m^2$ of hearth. The way the fluidized-bed kiln described above is operating provides an insight into the disclosed method for calcining mineral stock with the purpose of producing a variety of aggregates for hardening compositions. The method and kiln disclosed offer the opportunity of producing fine aggregates of any kind for concretes, such as sand, grit and chippings from argillaceous of eruptive rocks and mineral stock of any other kind. The sequence of events in producing any of the above-mentioned materials is practically the same but the conditions under which the process takes place are different.

Below will be found a description of the process used in the manufacture of such porous aggregates as keramzite sand, shungizite sand and expanded perlite sand, and of the conditions under which said process was carried out.

EXAMPLE 1

Production of Keramzite Sand

The stock used in the process was clay of the following composition (in terms of dry mass):

$SiO_2$, 55.80 wt %;
$Al_2O_3$, 17.97 wt %;
$Fe_2O_3$, 6.18 wt %;
$FeO$, 1.26 wt %;
$TiO_2$, 0.72 wt %;
$CaO$, 2.35 wt %;
$MgO$, 3.59 wt %;
$SO_3$, 0.41 wt %;
$K_2O$, 2.30 wt %;
$Na_2O$, 0.15 wt %;
Loss due to calcining, 9.27 wt %.

Clay with a pit moisture content of 25 % was broken up, dried in a drum dryer until the moisture content was between 8 and 10 percent, crushed in a hammer mill and then sifted through a sieve with the meshes 5 by 5 mm. The granulometric composition of the clay was as follows;
particles over 5 mm, 5 %;
particles between 2.5 and 5 mm, 17 %;
particles between 1.25 and 2.5 mm, 18 %;
particles between 0.6 and 1.25 mm, 18 %;
particles between 0.3 and 0.6 mm, 17 %;
particles between 0.15 and 0.3 mm, 18 %;
particles under 0.15 mm, 12 %.

The clay prepared in such a way was fed by weight into the heat treatment zone of a fluidized-bed kiln.

Simultaneously introduced into the calcining zone of the kiln were natural gas with a calorific value of 8500 kcal/$nm^3$ and air, both being admitted without premixing by means of a gas-burning contrivance in separate jets at the bottom of the calcining zone where the combustion of the gas took place. The diameter of kiln shaft in gas-burning calcining zone was 2 m and the gasburning contrivance consisted of 120 gas/air nozzles uniformly distributed over the area of hearth with a spacing of 150 mm. The nozzles were given a cross section which assured that the velocities of gas and air outflows were 150 and 30 m/sec, respectively, whereas the total rates of gas and air flows was 500 and 600 $m^3$/hr, respectively.

The high-temperature flue gases formed in the calcining zone were cooled down to 550°C by being mixed with cold air and then fed under the grating into the preheating zone for fluidizing and heating the material to around 300°C.

On leaving the preheating zone through an external pipe, the material was fed into the calcining zone where it was fluidized and calcined by the gas and air introduced into the bed at the bottom in separate jets uniformly distributed over the entire area of hearth. By virtue of the heat liberated during the combustion of gas directly in the bed of material, the temperature in calcining zone was maintained at 1040°±10°C and it was this temperature when the material had expanded and calcined. The calcine was fed from the calcining zone into a fluidized-bed cooler wherein its cooling took place to a temperature of 150°C by a rising stream of cold air. The cooled-down product was conveyed by means of air to storage and so were the particles of calcine on the form of dust extracted from the stream of flue gases on a lined cyclon.

The product was keramzite sand displaying the following properties:

Granulometric Composition particles between 5 and 10 mm, 6 wt %;
particles between 2.5 and 5 mm, 20 wt %;
particles between 1.25 and 2.5 mm, 22 wt %;

particles between 0.6 and 1.25 mm, 17 wt %;
particles between 0.3 and 0.6 mm, 15 wt %;
particles between 0.15 and 0.3 mm, 12 wt %
particles under 0.15 mm, 8 wt %
bulk density, between 500 and 600 kg/m³; compression strength of a cylindrical specimen, between 40 and 60 kg/cm²;
appearance, rounded off pellets with closed-pore structure and rough compact shell.

EXAMPLE 2

Production of Shungizite Sand

The stock used in the process were shungite shales with a moisture content of 3 percent, a particle size of 5 mm and displaying the following granulometric composition:
particles between 10 and 5 mm, 0.5 wt %;
particles between 5 and 2.5 mm, 22.0 wt %;
particles between 2.5 and 1.25 mm, 26.0 wt %;
particles between 1.25 and 0.6 mm, 20.0 wt %;
particles between 0.6 and 0.3 mm, 16.5 wt %;
particles between 0.3 and 0.15 mm, 12.0 wt %;
particles under 0.15 mm, 3.0 wt %.

Said stock was fed by weight into the preheating zone of a fluidized-bed kiln wherein calcining took place in the same way as described in Example 1.

Since the bulk density of shungite shales is 1400 to 1450 kg/m³, i.e., higher than that of clay stock, the caps of the nozzles of gas-burning contrivance were selected so as to assure that the velocities of gas and air outflows were 180 and 40 m/sec, respectively, whereas the total rates of gas and air flows were 750 8800 m³/hr, respectively. The temperature in calcining zone was maintained between 1100° and 1300°C and that in preheating zone at about 300°C.

The product was shungizite sand displaying the following properties:

Granulometric Composition particles between 5 and 10 mm, 5 wt %;
particles between 5 and 2.5 mm, 30 wt %;
particles between 2.5 and 1.25 mm, 28 wt %;
particles between 1.25 and 0.6 mm, 20 wt %;
particles between 0.6 and 0.3 mm, 10 wt %;
particles between 0.3 and 0.15 mm, 6.5 wt %;
particles under 0.15 mm, 0.5 wt %;
bulk density between 550 and 650 kg/m³;
mechanical strength, 50 kg/cm²;
appearance, rounded off pellets with closed-pore structure and rough compact shell.

EXAMPLE 3

Production of Expanded Perlite Sand

The stock used was perlite of the following chemical composition:
$SiO_2$, 71.68 wt %;
$Al_2O_3$, 14.35 wt %;
$Fe_2O_3$, 1.71 wt %;
$TiO_2$, 0.23 wt %;
CaO, 1.17 wt %;
MgO, 0.16 wt %;
$SO_3$, 0.01 wt %;
$K_2O$, 2.90 wt %;
$Na_2O$, 1.22 wt %;
Loss due to calcining, 6.57 wt %.

The stock was crushed on a hammer mill to particles of a size under 5 mm and separated by sifting was a portion for calcining with a granulometric composition as follows:
particles between 2.5 and 5 mm, 61 wt %;
particles between 1.2 and 2.5 mm, 38 wt %;
particles between 0.6 and 1.2 mm, 1 wt %.

Said stock was fed into the preheating zone of a fluidized-bed kiln wherein the process of preheating and calcining took place as described in Example 1. Gas and air were fed into the bed at the velocities of 120 and 30 m/sec, respectively, whereas the total rates of gas and air flows were 480 and 5000 m³/hr, respectively. The temperature in calcining zone was maintained between 1050° and 1070°C and that in preheating zone at around 400°C.

The product was expanded perlite displaying the following properties:

Granulometric Composition particles over 5 mm, 10 wt %;
particles between 2.5 and 5 mm, 60 wt %;
particles between 1.2 and 2.5 mm, 20 wt %;
particles between 0.6 and 1.2 mm, 5 wt %;
particles between 0.3 and 0.6 mm, 2.5 wt %;
particles between 0.15 and 0.6 mm, 2.0 wt %;
particles under 0.15 mm, 0.5 wt %;
bulk density, between 180 and 200 kg/m³;
mechanical strength, between 3 and 5 kg/cm²;
water absorption of particles between 2.5 and 5 mm after 1 hr, between 150 and 160 wt %.

As it will be noted from the description, the disclosed method for producing aggregates for hardening building compositions offers high efficiency and simplicity of realization, assures high quality of product, and the fluidized-bed kiln disclosed is a high-productivity unit capable of operating both stably and reliably.

What is claimed is:

1. A method for producing aggregates for hardening compositions, predominantly concretes, which comprises calcining mineral stock in a fluidized bed by introducing gaseous fuel and air into said bed at the bottom thereof in separate rising jets uniformly distributed over the cross section of said bed, with the outflow of either said gaseous fuel or said air being directed upwardly at an angle to the vertical, and burning said gaseous fuel directly in said bed of the material being processed.

2. A method as claimed in claim 1 wherein the velocities of the outflows of gaseous fuel and air are 100 to 300 m/sec and 10 to 50 m/sec, respectively.

3. In a fluidized-bed kiln for calcining mineral stock incorporating a hearth and burners fitted into said hearth; the improvement consisting in that said burners are uniformly distributed over the entire area of said hearth and each of said burners is a gas/air nozzle comprising inner and outer coaxial vertical tubes, said inner tube having a central gas channel and said inner and outer tubes defining between them an annular air channel, a cone-shaped cap fitted into the upper end of said inner tube, and a diffuser fitted into the upper end of said outer tube, said cone-shaped cap having a central passage extending vertically therethrough in communication with said gas channel for directing vertical outflow of gas, and said cone-shaped cap and said diffuser defining between them an annular passage in communication with said air channel and extending upwardly at an angle to the vertical for directing outflow of air upwardly at an angle to the vertical.

4. In a fluidized-bed kiln for calcining mineral stock incorporating a hearth perforated for the admission of air and burners for the admission of gaseous fuel; the improvement consisting in that said burners are fitted into said hearth of said kiln uniformly over its entire area and each of said burners is a gas nozzle projecting upwards and comprising a vertical tube having a central gas channel, and a cone-shaped cap fitted into the upper end of said tube, said cone-shaped cap and the wall of said tube defining between them an annular passage in communication with said gas channel and extending at an angle to the vertical for directing outflow of gas upwardly at an angle to the vertical.

5. A kiln as claimed in claim 4 wherein the space above said perforated hearth is filled with a bulk refractory material placed level with the nozzles.

6. A calcined mineral stock aggregate for hardening compositions produced in accordance with the method of claim 1.

* * * * *